US010587122B2

(12) United States Patent
Bruce

(10) Patent No.: US 10,587,122 B2
(45) Date of Patent: Mar. 10, 2020

(54) ELECTRICAL INTERCONNECT SYSTEM

(71) Applicant: ROLLS-ROYCE plc, London (GB)

(72) Inventor: Graham P. Bruce, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/142,021

(22) Filed: Sep. 26, 2018

(65) Prior Publication Data

US 2019/0097429 A1    Mar. 28, 2019

(30) Foreign Application Priority Data

Sep. 27, 2017 (GB) .................................. 1715598.7

(51) Int. Cl.
    *H02J 4/00*      (2006.01)
    *B64D 27/02*     (2006.01)
    *H01B 9/02*      (2006.01)
    *B63H 21/17*     (2006.01)

(52) U.S. Cl.
CPC ................ *H02J 4/00* (2013.01); *B64D 27/02* (2013.01); *H01B 9/02* (2013.01); *B63H 21/17* (2013.01); *B64D 2027/026* (2013.01); *B64D 2221/00* (2013.01)

(58) Field of Classification Search
CPC .. H02J 4/00; H01B 9/02; B64D 27/02; B64D 2221/00; B64D 2027/026; B63H 21/17
See application file for complete search history.

(56) References Cited

U.S. PATENT DOCUMENTS

| 8,031,458 | B2 | 10/2011 | Braden et al. |
| 9,242,726 | B2 | 1/2016 | Garcia et al. |
| 10,279,759 | B2 * | 5/2019 | Iwashima ............... G05B 13/02 |

(Continued)

FOREIGN PATENT DOCUMENTS

GB      2497136      6/2013

OTHER PUBLICATIONS

Great Britain Search Report dated Mar. 12, 2018, issued in GB Patent Application No. 1715598.7.

(Continued)

*Primary Examiner* — Daniel Kessie
(74) *Attorney, Agent, or Firm* — Shumaker & Sieffert, P.A.

(57) ABSTRACT

The present disclosure concerns an electrical interconnect system for a vehicle such as an aircraft or marine/submarine vessel. Example embodiments include a vehicle comprising: a first electrical generator; a second electrical generator; an engine arranged to drive the first and second electrical generators; a first electrical distribution system connected to the first electrical generator and arranged to distribute electrical power within the vehicle, the first electrical distribution system comprising a transmission path and a return path; a second electrical distribution system connected to the second electrical generator, the second electrical distribution system comprising a transmission path and a return path; an electric motor configured to provide propulsion for the vehicle and connected to the second electrical generator via the second electrical distribution system, wherein the return path of the second electrical distribution system provides a portion of the return path of the first electrical distribution system.

7 Claims, 4 Drawing Sheets

(56) References Cited

U.S. PATENT DOCUMENTS

| | | | |
|---|---|---|---|
| 2004/0129835 A1* | 7/2004 | Atkey | B64D 13/06 244/118.5 |
| 2006/0056783 A1* | 3/2006 | Dion | G02B 6/4417 385/101 |
| 2007/0280610 A1* | 12/2007 | Mallya | G02B 6/4416 385/101 |
| 2008/0156931 A1 | 7/2008 | Charon et al. | |
| 2010/0193630 A1* | 8/2010 | Duces | H02J 3/02 244/58 |
| 2011/0068228 A1 | 3/2011 | Ayme et al. | |
| 2012/0223720 A1 | 9/2012 | Landes et al. | |
| 2014/0138479 A1 | 5/2014 | Vieillard et al. | |
| 2014/0197681 A1* | 7/2014 | Iwashima | B60R 16/03 307/9.1 |
| 2015/0293163 A1 | 10/2015 | Lebreton et al. | |
| 2019/0016470 A1* | 1/2019 | Huang | B64D 27/10 |

OTHER PUBLICATIONS

Extended European Search Report from counterpart EP Application No. 18192234.5, dated Oct. 16, 2018, 9 pgs.

Response to the Extended European Search Report from counterpart EP Application No. 18192234.5, dated Oct. 16, 2018, dated Oct. 2, 2019, 22 pgs.

\* cited by examiner

ELECTRICAL INTERCONNECT SYSTEM

CROSS-REFERENCE TO RELATED APPLICATIONS

This application is based upon and claims the benefit of priority from British Patent Application No. GB 1715598.7, filed on 27 Sep. 2017, the entire contents of which are herein incorporated by reference.

BACKGROUND

Technical Field

The present disclosure concerns an electrical interconnect system for a vehicle such as an aircraft or marine/submarine vessel.

Description of the Related Art

Present aircraft systems generally include electrical systems for non-propulsive loads. Electrical cables may be provided to distribute electrical power throughout the aircraft from an electrical generator to various loads such as navigation and control systems, lighting and passenger inflight entertainment systems. For primarily metal-bodied aircraft, an electrical current return path may be provided by the airframe itself. For low voltage systems, which may be generally defined as having operating voltages below around 1 kV DC or RMS AC, a common current return path through the body of the aircraft is adequate for most purposes. For higher voltages, however, and in particular where electrical distribution may be required for propulsion, this may be inadequate due to the need for shielding or prevention of arcing. In addition, as more structural components in aircraft are produced with composite materials instead of metal, a common current return path may no longer be possible using the structure of the aircraft. Instead, as disclosed in U.S. Pat. No. 8,031,458 B2, for example, a composite aircraft structure may be provided with conductive electrical pathways to provide redundant electrical pathways extending along a substantial portion of the aircraft, the pathways functioning to carry return or fault currents, provide grounding, carry lightning current, provide electromagnetic shielding, minimise resistance and voltage differential and provide a bleed path for electrostatic discharge.

SUMMARY

According to a first aspect there is provided a vehicle comprising:
a first electrical generator;
a second electrical generator;
an engine arranged to drive the first and second electrical generators;
a first electrical distribution system connected to the first electrical generator and arranged to distribute electrical power within the vehicle, the first electrical distribution system comprising a transmission path and a return path;
a second electrical distribution system connected to the second electrical generator, the second electrical distribution system comprising a transmission path and a return path;
an electric motor configured to provide propulsion for the vehicle and connected to the second electrical generator via the second electrical distribution system,
wherein the return path of the second electrical distribution system provides a portion of the return path of the first electrical distribution system.

Providing a portion of the return path of the first electrical distribution system using the return path of the second electrical distribution system can result in weight, cost and complexity savings because that portion of the return path of the first electrical distribution system does not need to be separately provided.

The first electrical distribution system may be configured to operate at voltages in a first operating range below around 1000V DC or RMS AC, while the second electrical distribution system may be configured to operate at voltages in a second operating range above around 1000V DC or RMS AC. The first voltage range may be at or below around 270 V DC or RMS AC.

The second electrical distribution system may comprise a shielded coaxial cable connected between the second electrical generator and the electric motor, an outer electrical conductor of the coaxial cable providing the return path of the second electrical distribution system and an inner electrical conductor providing the transmission path of the second electrical distribution system.

The return path of the second electrical distribution system may provide the return path of the first electrical distribution system between the electric motor and the engine.

The vehicle may be an aircraft, such as a hybrid electric aircraft having propulsion provided by an engine together with propulsion provided additionally or alternatively by an electric motor. The engine may be provided on a wing of the aircraft and the electric motor may be provided at a rear section of the aircraft, with the second electrical distribution system extending along the aircraft fuselage.

In alternative embodiments, the vehicle may be a marine or submarine vessel.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
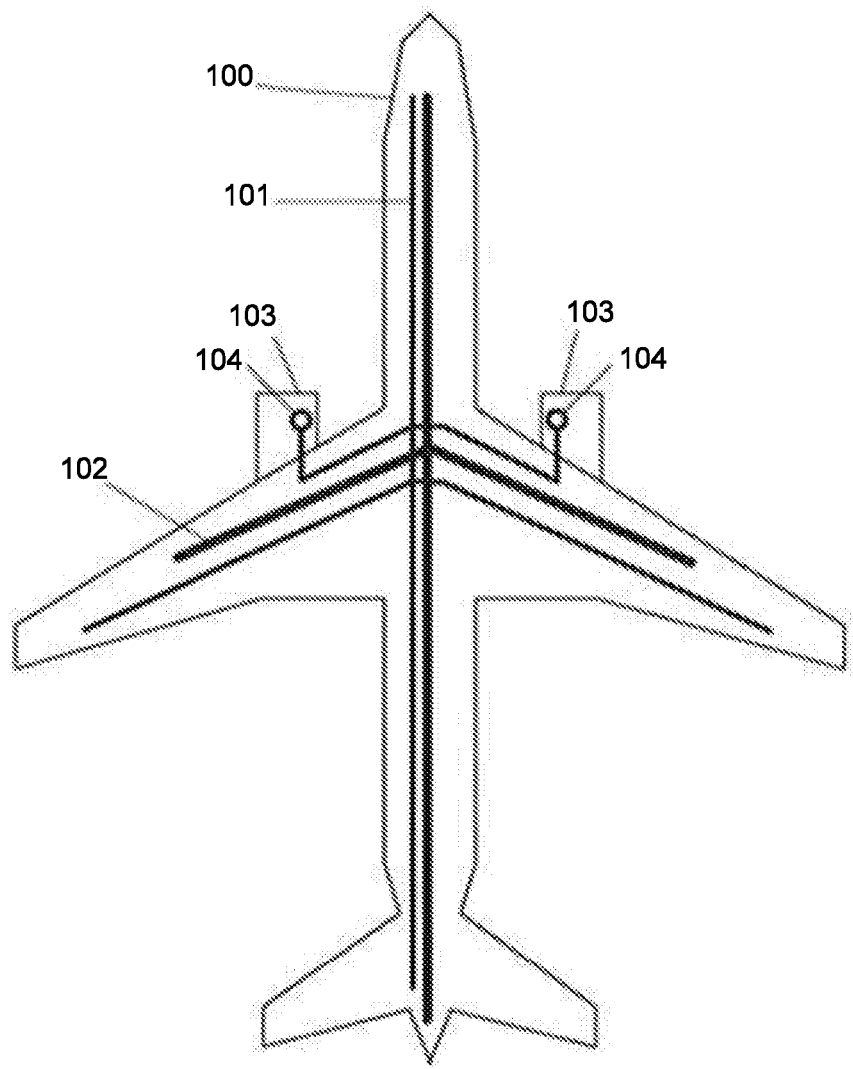
FIG. 1 is a schematic plan view of an electrical system for a conventional aircraft.

FIG. 1 illustrates in schematic plan view an example of a conventional aircraft 100 with an electrical distribution network comprising a low voltage (LV) primary distribution system 101 and an electrical structural network or current return network 102. The network 102 may be representative of the electrically conductive aircraft body or electrical conductors provided for example within a composite aircraft body. The aircraft 100 is equipped with an engine 103 on each wing, each engine connected to an electric generator 104 for generating electric power to be distributed by the LV primary distribution system 101. Electric power is carried throughout the aircraft 100 by cables connecting the generators 104 to the various loads in the aircraft 100. The electrical return path may be provided by using the shell of the aircraft and/or with additional cabling.

Figure 2:
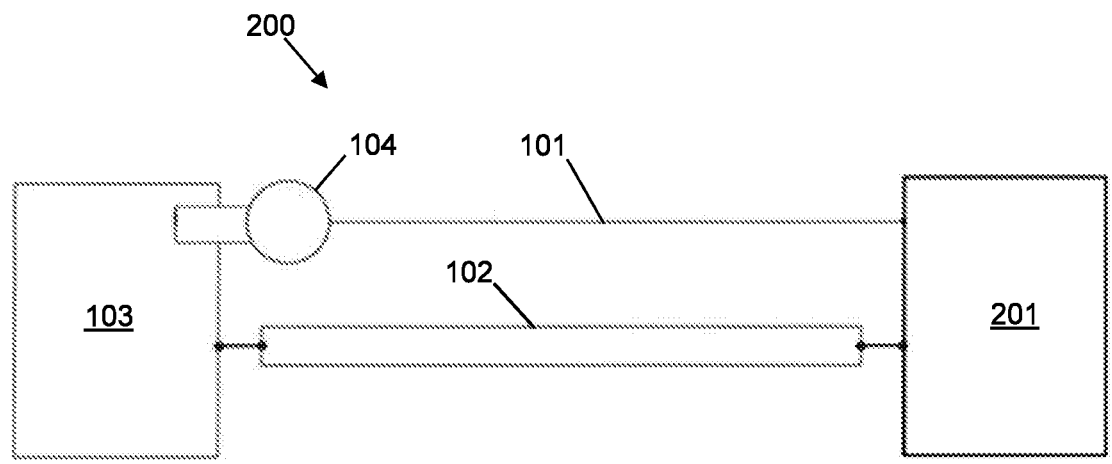
FIG. 2 is a schematic electrical block diagram of an electrical system for a conventional aircraft.
Figure 3:
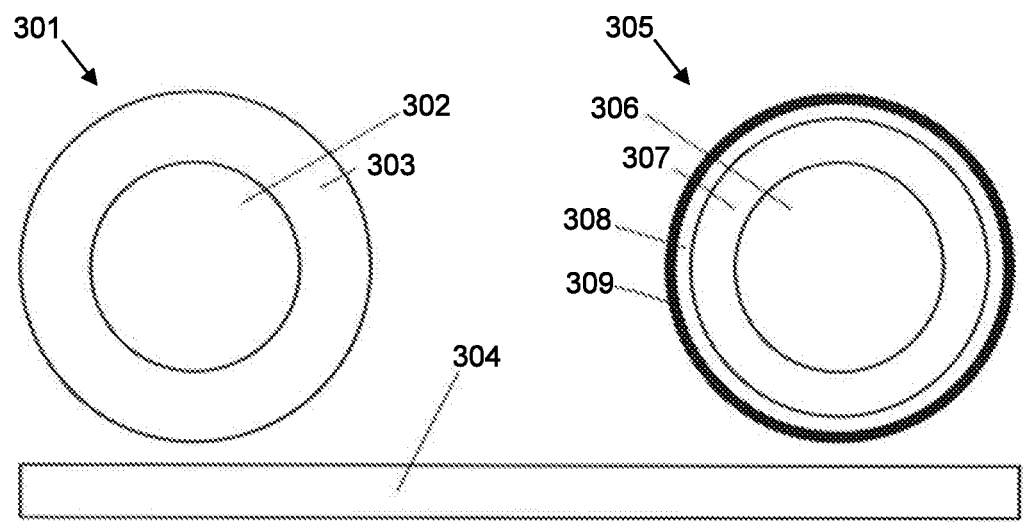
FIG. 3 is a schematic sectional view of a) an unshielded cable and b) a shielded cable.

A general schematic diagram of the electrical system 200 for a conventional aircraft 100 of the type shown in FIG. 1 is illustrated in FIG. 2. An engine 103 drives an electrical generator 104, which provides electrical power to various non-propulsive electrical loads 201 via a primary electrical distribution system 101, which may for example be a 3-phase 4-wire LV interconnect. A current return path is provided by the electrical structural network/current return network 102. Such systems tend to be low voltage electrical systems, where a low voltage system may be typically 115 V RMW or 230 V RMS (line to neutral) three phase systems, 270 V DC or +/−270 V DC. In each case, such systems may be implemented using unshielded cabling. FIG. 3 illustrates an example of an unshielded cable 301 in schematic sectional view, the cable 301 having an electrical conductor core 302 and an outer electrical insulator 303. The current return path may be provided by the aircraft structure 304. FIG. 3 also shows for comparison an example shielded cable 305, having an inner electrical conductor 306, a primary electrical insulation layer 307, an outer electrical conductor 308 and an outer electrical insulation layer 309.

Providing a current return path through either the aircraft body (if electrically conductive) or via additional distributed electrical conductors (particularly for composite aircraft structures) can result in weight optimisation for conventional aircraft with electrical systems providing low voltage non-propulsive loads. For hybrid electric aircraft, however, such solutions may not be optimal because an additional high voltage electrical system is required for carrying propulsive electrical loads. The high voltage electrical system will require shielding due to operating at high voltages (typically >1 kV AC or DC) and cannot therefore readily be combined with the metal chassis of a conventional aircraft body or with an existing electrical structural network/current return network. Such a high voltage system will require electrical shielding to be in intimate contact with the primary insulation around the high voltage conductor, thereby ruling out systems in which an air gap is used for insulation. Air gaps are particular weak spots in aircraft due to the reduction in dielectric breakdown potential at high altitude.

Figure 4:
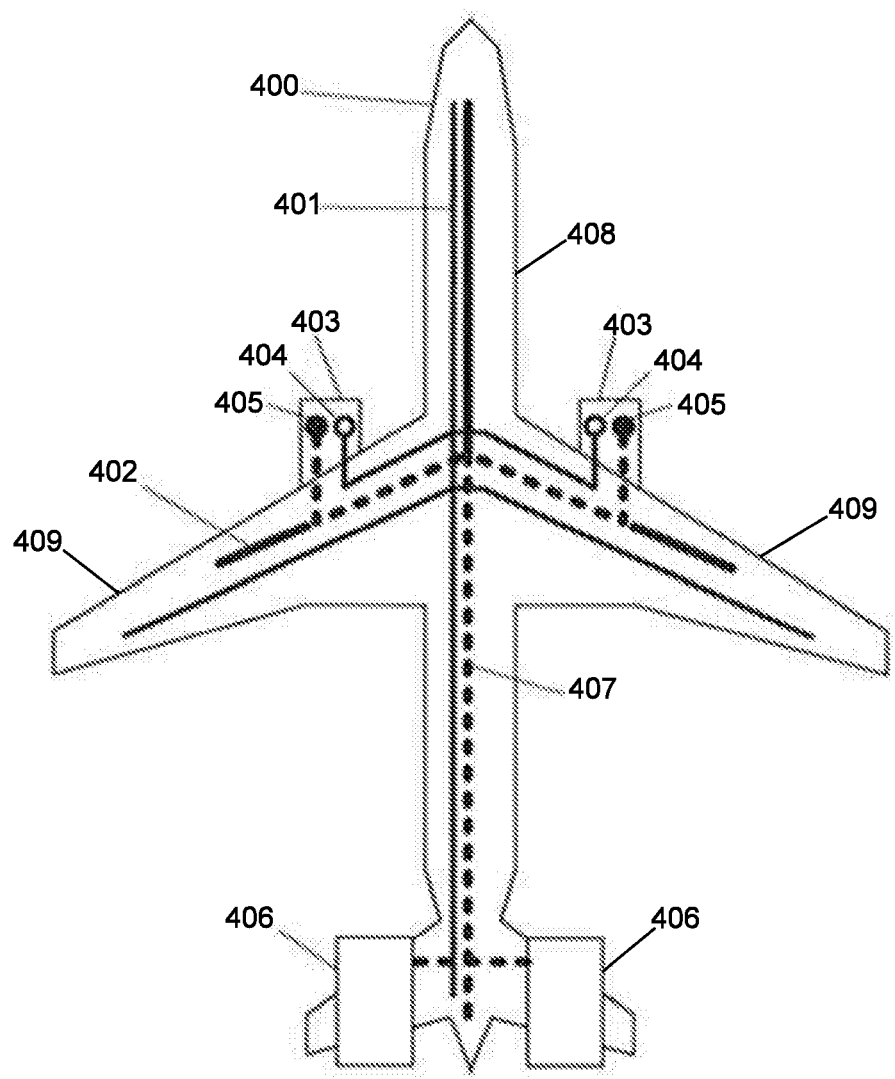
FIG. 4 is a schematic plan view of an example electrical system having a combined high voltage and low voltage current return path.

FIG. 4 illustrates in schematic plan view an example hybrid electric aircraft 400. The aircraft 400 comprises an engine 403 on each wing, connected to first and second electrical generators 404, 405. The first electrical generator 404 may be arranged to generate a low voltage supply for non-propulsive loads within the aircraft 400, while the second electrical generator 405 is arranged to generate a high voltage supply for propulsive loads. The engine 403 on each wing 409 is arranged to drive the first and second electrical generators 404, 405. A first (low voltage) electrical distribution system is connected to the first electrical generators 404 and arranged to distribute non-propulsive electrical power within the aircraft 400. The first electrical distribution system comprises a transmission path 401 and a return path 402, similar to a conventional aircraft electrical system. A second (high voltage) electrical distribution system 407 is connected to the second electrical generators 405, also comprising a transmission path and a return path. Propulsors driven by electric motors 406 are provided at the rear of the aircraft 400, which are configured to provide additional or alternative propulsion for the aircraft 400. Each electric motor 406 is connected to the second electrical generator 405 via the second electrical distribution system 407.

In the example shown in FIG. 4, the return path of the second electrical distribution system 407 provides a portion of the return path of the first electrical distribution system. This allows the return path for the first electrical distribution system to effectively be omitted in areas where the second electrical distribution system is present, thereby saving weight and space. This is particularly advantageous in cases where the electrically propulsive elements are located distant from the generators. In the example shown, electrically driven propulsors are provided on the tail section of the aircraft 400, while the generators are provided on the wings 409 at the location of the engines 403. In other areas, such as in portions of the wings 409 beyond the engines 403 or in the fuselage 408 forward of the wings 409, a return path for the first electrical distribution system may be provided, which is electrically connected to the return path of the second electrical distribution system 407.

Figure 5:
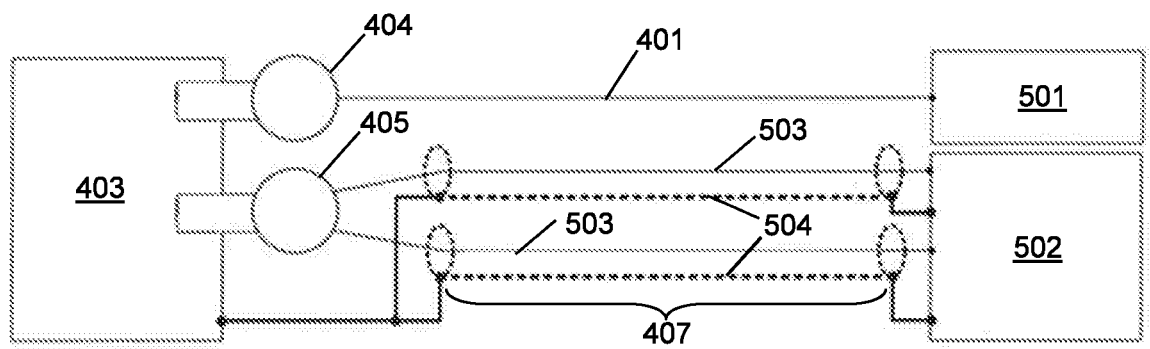
FIG. 5 is a schematic electrical block diagram of an example electrical system having a combined high voltage and low voltage current return path.

FIG. 5 illustrates schematically an electrical diagram showing the example electrical system for the aircraft 400 of FIG. 4. An engine 403 drives a first (low voltage) electrical generator 404 and a second (high voltage) electrical generator 405. The first electrical generator 404 provides electrical power via the first electrical distribution system 401 to non-propulsive electrical loads 501 within the aircraft 400. The second electrical generator 405 provides electrical power via the second electrical distribution system 407 (which in this example is divided into two portions) to electrically powered propulsive elements 502. Each portion of the second electrical distribution system 407 comprises an energised high voltage conductor 503 surrounded by a shield 504 serving as a current return path for both the high voltage and low voltage systems.

Figure 6:
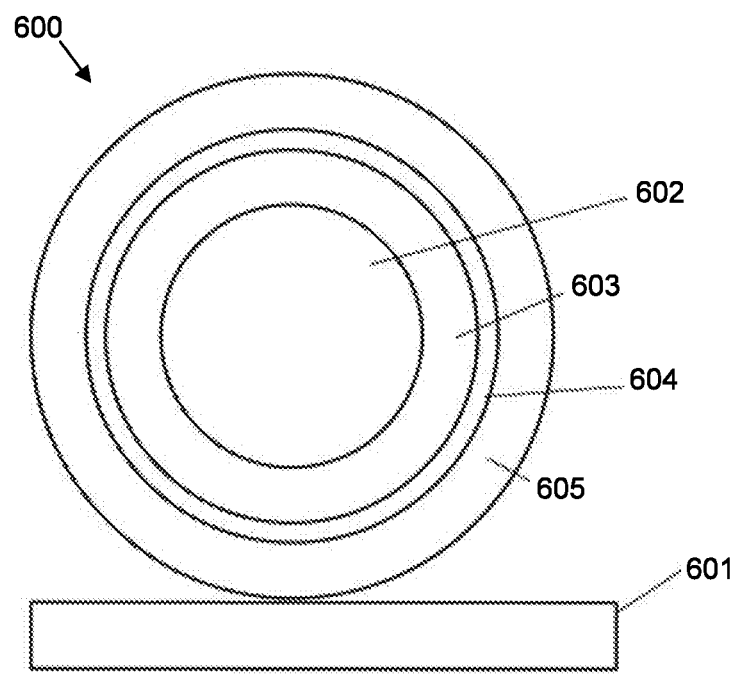
FIG. 6 is a schematic sectional view of an example cable for a combined high voltage and low voltage interconnect.

An example schematic sectional view of a cable 600 suitable for providing the second electrical distribution system 407 is shown in FIG. 6. The cable 600, which is shown adjacent a portion of the aircraft structure 601, comprises a high voltage electrical conductor 602, surrounded by a high voltage electrical insulation layer 603, around which is provided a conductive shield 604 serving as a current return path and around which is provided a primary insulation layer 605 serving as a cable jacket.

Although the examples provided herein relate primarily to aircraft electrical systems, similar arrangements may be applied to marine or submarine vessels, which may benefit from at least some of the advantages described herein. Such vessels may also be configured for hybrid electric operation and can therefore also benefit in terms of space and weight savings from using a return path of a high voltage electrical distribution system for at least a portion of the return path of a low voltage electrical distribution system.

It will be understood that the invention is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

The invention claimed is:
1. A vehicle comprising:
a first electrical generator;
a second electrical generator;

an engine arranged to drive the first and second electrical generators;

a first electrical distribution system connected to the first electrical generator and arranged to distribute electrical power within the vehicle, the first electrical distribution system comprising a transmission path and a return path;

a second electrical distribution system connected to the second electrical generator, the second electrical distribution system comprising a transmission path and a return path; and an electric motor configured to provide propulsion for the vehicle and connected to the second electrical generator via the second electrical distribution system, wherein the return path of the second electrical distribution system provides a portion of the return path of the first electrical distribution system, and wherein the second electrical distribution system comprises a shielded coaxial cable connected between the second electrical generator and the electric motor, an outer electrical conductor of the coaxial cable providing the return path of the second electrical distribution system and an inner electrical conductor providing the transmission path of the second electrical distribution system.

2. The vehicle of claim 1, wherein the return path of the second electrical distribution system provides the return path of the first electrical distribution system between the electric motor and the engine.

3. The vehicle of claim 1, wherein the first electrical distribution system is configured to operate at voltages in a first operating range below around 1000V DC or RMS AC and the second electrical distribution system is configured to operate at voltages in a second operating range above around 1000V DC or RMS AC.

4. The vehicle of claim 3, wherein the first operating range is at or below around 270 V DC or RMS AC.

5. The vehicle of claim 1, wherein the vehicle is an aircraft.

6. The vehicle of claim 5, wherein the engine is provided on a wing of the aircraft and the electric motor is provided at a rear section of the aircraft, the second electrical distribution system extending along the aircraft fuselage.

7. The vehicle of claim 1, wherein the vehicle is a marine or submarine vessel.

* * * * *